Patented Mar. 9, 1937

2,073,138

UNITED STATES PATENT OFFICE 2,073,138

HEAT INSULATING MATERIAL

George A. Bole, Columbus, Ohio, assignor to Laclede Christy Clay Products Company, St. Louis, Mo., a corporation of Missouri No Drawing. Application August 9, 1930, Serial No. 474,297

2 Claims. (Cl. 106—9)

This invention relates to a novel heat insulating material that is distinguished from prior heat insulating materials, principally in that it is highly refractory.

Numerous methods have heretofore been devised for producing heat insulating materials that are light in weight and also refractory, such as forming the material from a granular refractory substance whose particles or grains are of a selected size; forming the material from clay that has been subjected to a bloating operation while in a plastic state, and thereafter fired to a temperature sufficient to produce a strong body; or forming the material from diatomaceous earth or a similar substance, mixed with bond clay and a carbonaceous substance, and thereafter subjected to a firing operation, wherein the carbonaceous substance is consumed or driven off, thus increasing the porosity of the finished product or material. Prior heat insulating materials of the kind above described have not proved commercially successful, due to their relatively low heat insulating properties, and to the fact that they have a tendency to shrink and lose their insulating properties when subjected to advanced temperatures. There is an extensive commercial demand for a material of high insulating properties, that is highly refractory and which will not break down, shrink or lose its insulating properties at temperatures in excess of 2500° F. The insulating materials that have heretofore been used or devised are not capable of successfully withstanding such temperatures, as they have not the required refractoriness nor the required volume constancy.

One object of my invention is to provide a highly cellular material that has greater heat insulating properties than the materials of this general character or nature that have been heretofore known.

Another object is to provide an insulating refractory material whose volume will remain substantially constant, and whose heat insulating properties will not be reduced, impaired or changed by an excessively high temperature, for example, a temperature well over 3000° F.

Another object is to provide a heat insulating material that is highly refractory and light in weight.

And still another object is to provide a practicable process for producing heat insulating material having the desirable characteristics above described.

To this end I have devised a highly cellular heat insulating material that is produced or formed principally from a finely-divided or granular refractory material whose original grains or particles have been modified or changed in such a way as to produce an infinitude of small cells distributed more or less regularly throughout the mass. Various raw materials may be used to produce or form my improved heat insulating material, and various procedures may be employed to modify or change the original grains of the material, so as to produce a highly cellular product. I prefer to use raw (uncalcined) cyanite, as such material has a pyrometric cone equivalent value of 36 (approximately 3200° F.) and shows very little tendency to deform below this temperature. I also prefer to modify or change the original grains of the raw cyanite by shattering said grains by heat treatment. If desired, however, the cyanite may be mixed with other materials, agents or substances, so as to produce a mixture or batch in which gas will be generated or liberated, with the result that additional cells will be formed in the product being produced.

Upon heating raw cyanite to approximately 2200° F., the cyanite crystals ($Al_2O_3SiO_2$) are shattered and broken down, and subsequently recrystallized into an infinitude of small Mullite crystals ($3Al_2O_3 2SiO_2$) plus a small amount of a high silica glass with intervening voids or cells, giving the body a very high porosity. The Mullite formation, due to its low co-efficient of thermal expansion, makes the finished material highly resistant to thermal shock, and therefore, increases its resistance to spalling. Other raw materials may be used, however, to produce my improved heat insulating material, providing the raw material that is used is of a highly refractory nature and is of such a character or structure that when it is subjected to a high temperature the original grains or particles of same will be shattered or split up in such a manner as to produce an infinitude of small cells which impart great insulating properties to the finished product. I prefer to use raw cyanite whose grains or particles are of approximately one size, as the use of a sized raw material increases the open pore space and adds considerably to the insulating properties of the finished product or material.

The process that I prefer to use for producing my improved heat insulating material consists in converting finely-divided raw (uncalcined) cyanite into bricks or other molded objects, and then heating said molded objects to a temperature of approximately 2600° F. If this method of heating be employed, the firing operation must be accurately controlled between the temperatures of 2300° F., and 2600° F., due to the fact that between these temperatures expansion of the original grains or particles takes place with increasing rapidity, and unless accurate control is maintained, the finished product or material will have little cohesion, and in extreme cases, will crack and have little or no body structures.

As previously stated, it is preferable to use raw material whose grains or particles are of substantially the same size, so as to increase the open pore space. Good results can be obtained with raw cyanite that will pass through a 48 mesh screen and be retained on an 80 mesh screen. In converting the graded granular raw material into a molded object any preferred or suitable procedure may be used, as, for example, mixing the granular cyanite with an amount of binding material, such as clay corresponding to 10% to 20% by weight of the mixture, then molding the mixture into bricks or other objects, then drying said molded objects, and thereafter, firing said molded objects to a temperature of approximately 2600° F., in a ceramic kiln. Instead of mixing the cyanite with clay preparatory to shaping, molding or forming the same into objects, the granular cyanite may be mixed with small amounts of other binding materials, such as silica gel, Bentonite or especially prepared water glass. As previously stated, the firing step in which the original grains or particles of the cyanite are shattered, split or divided must be accurately controlled between 2300° F. and 2600° F. The screen size of the cyanite grains is also of paramount importance and will vary with the rate of heating and with the strength and porosity demanded in the final product.

A heat insulating material of the kind above described is adapted for use for purposes where it is essential that the material be of light weight. As it embodies the two desirable characteristics of being light in weight and highly refractory, it can be used for numerous purposes for which conventional heat insulating materials are not adapted.

If it is desired to produce a heat insulating material, which, in addition to being highly refractory, is of lighter weight than the insulating material previously described, steps may be taken to cause gas to be generated or liberated in the green batch so as to create additional voids or cells in the product. Any conventional or suitable bloating procedure may be used to obtain gas liberation in the batch mix, but one very satisfactory procedure is as follows: Finely-divided or finely ground raw cyanite is mixed with raw clay (10% to 25%) of a highly refractory nature and preferably quite plastic, together with a small amount of dolomite or other carbonate (usually about 2%). A weak solution (2%) of a strong acid is used to render the above mixture plastic, and after the mass has attained a porous structure, due to the evolution of $CO_2$ gas within the mass, the mixture is dried and fired, as previously described. If speed is required in the process of manufacture, a small amount (2%) of plaster of Paris, powdered silica jell or any other suitable material that will raise the viscosity, and thus entrap the bubbles and set the mass, may be added to the mixture prior to the molding operation, so as to facilitate handling of the wet shapes. The cyanite may be so finely ground that no clay is required, although we do not prefer this procedure. The procedure outlined above is as described in my pending application for patent Serial No. 453,395, Husain and Bole, filed May 17, 1930.

Any other suitable bloating procedure may be used, and while I have stated that liberation of gas in the batch mix is obtained by the interaction of a carbonate and an acid, I wish it to be understood that my invention contemplates the liberation of gas in the batch mix by the interaction of other substances or materials.

When bloating is resorted to in the operation of producing my improved heat insulating material, I prefer to first grind and size the cyanite to a material ranging from 48 to 80 mesh. To 100 weight of cyanite is added 10 to 15 parts clay, 2 parts of 100 mesh dolomite and 2 parts of plaster of Paris as the dry batch. The wet batch consists of water to which has been added 2% by weight of sulfuric acid, and if green strength is lacking, 10% of a sulfite liquor binder (Bindex) can be used. The liquid batch is added to the dry batch in such a way as to produce or obtain a thick paste (usually about 30 parts of the wet batch to 100 parts of the dry batch). This thick paste is then poured into molds, wherein it expands. It is struck off after the action is complete (2 to 3 minutes) and dried and fired as previously described.

Having thus described my invention, what I claim as new and desire to secure by Letters Patent is:

1. A process of manufacturing heat insulating material, consisting of molding a mass constituted of sized raw cyanite and a small amount of clay to which has been added sufficient chemical and dilute acid solution to produce bloating of the mass, drying said molded mass, and firing said dried mass at a sufficiently high temperature and at a rate to produce a highly cellular product.

2. In the manufacture of a highly cellular bloated heat insulating material containing cyanite, the steps of grinding the raw cyanite to a mesh ranging from 48 to 80, making a thick paste therewith of clay, dolomite, plaster of Paris, and sulphuric acid, pouring the thick paste into a mold to permit expansion therein, and then drying and firing the product at a temperature controlled between 2300° F. and 2600° F.

GEORGE A. BOLE.